United States Patent [19]

Ishii

[11] Patent Number: 4,847,725
[45] Date of Patent: Jul. 11, 1989

[54] CIRCUIT BREAKER

[75] Inventor: Kazuhiro Ishii, Fukuyama, Japan

[73] Assignee: Mitsubishi Denki Kabushiki Kaisha, Tokyo, Japan

[21] Appl. No.: 215,956

[22] Filed: Jul. 7, 1988

[30] Foreign Application Priority Data

Jul. 7, 1987 [JP] Japan ................. 62-170155

[51] Int. Cl.⁴ .......................................... H02H 3/093
[52] U.S. Cl. ...................................... 361/96; 361/97; 340/662
[58] Field of Search ................. 361/18, 44–50, 361/86, 91, 93–98, 99, 100, 102; 340/641, 642, 650, 651, 662, 664; 364/481, 483

[56] References Cited

U.S. PATENT DOCUMENTS 4,224,651 9/1980 Allen et al. ................. 361/97 X
4,347,541 8/1982 Chen et al. ................. 361/97 X
4,763,220 8/1988 Belbel et al. ................. 361/93 X

FOREIGN PATENT DOCUMENTS 55-29931 7/1980 Japan.
60-32211 2/1985 Japan.

Primary Examiner—Todd E. Deboer
Attorney, Agent, or Firm—Lowe, Price, LeBlanc, Becker & Shur

[57] ABSTRACT

When a current of a distribution line is increased to about two times of a rated current of a circuit breaker, the circuit breaker is operated to open the distribution line with a comparatively long time lag such as 100 seconds by a long time-lag tripping circuit of the circuit breaker, on the other hand, in case that a current of 80–90% of the rated current have continuously flowed before the current is increased as mentioned above, the time lag which is set in the long time-lag tripping circuit is shortened.

1 Claim, 6 Drawing Sheets

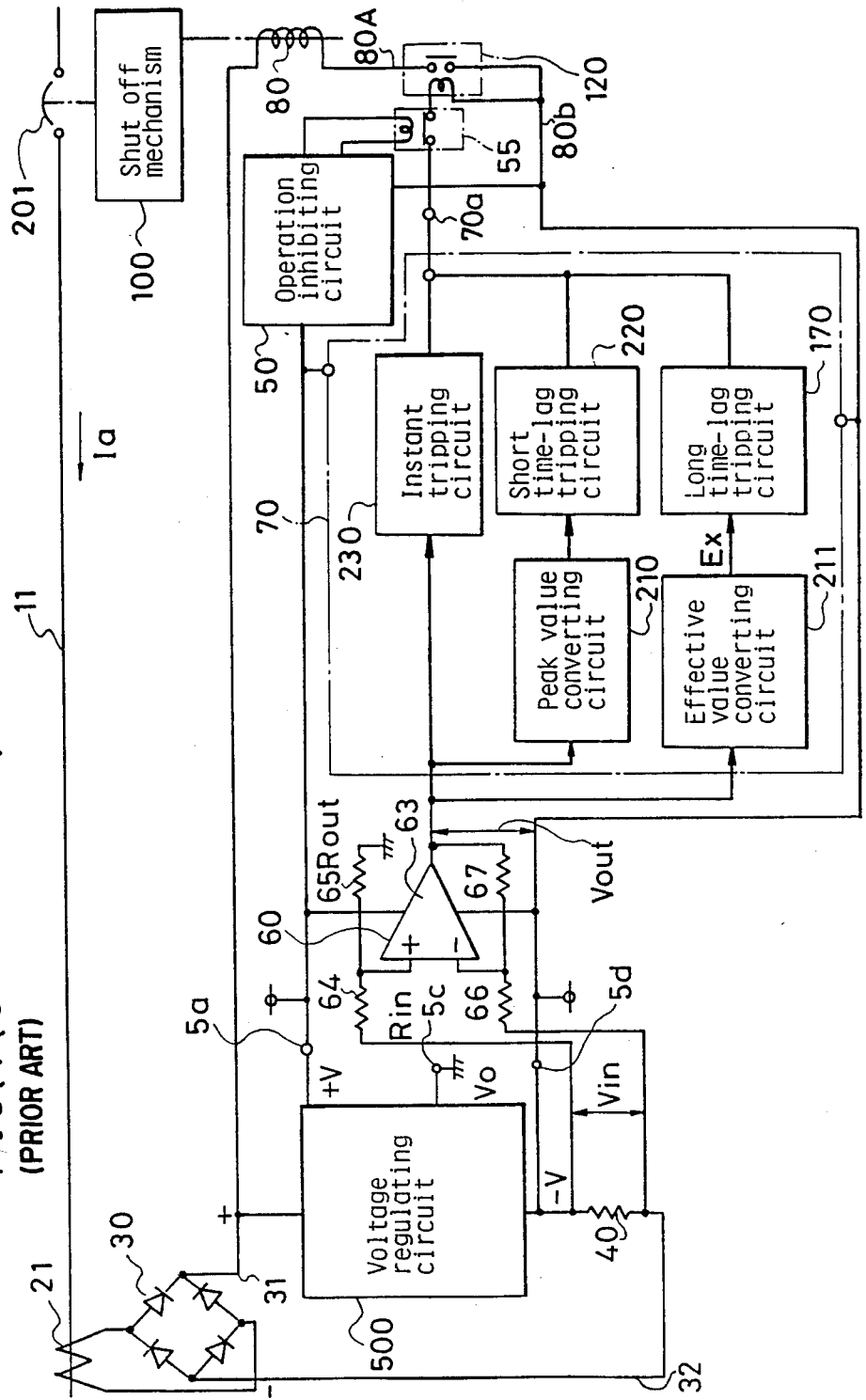
FIG.4 (General Art) (PRIOR ART)

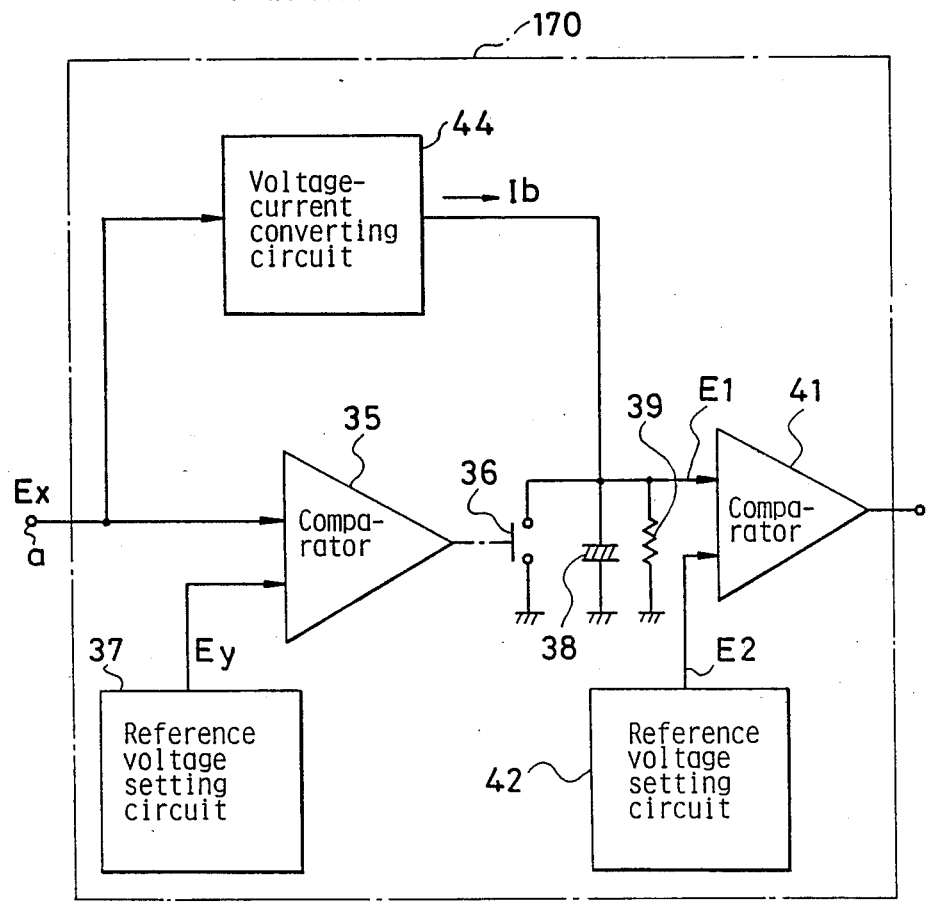
FIG.5 (General Art) (PRIOR ART)

FIG.6 (General Art)
(PRIOR ART)
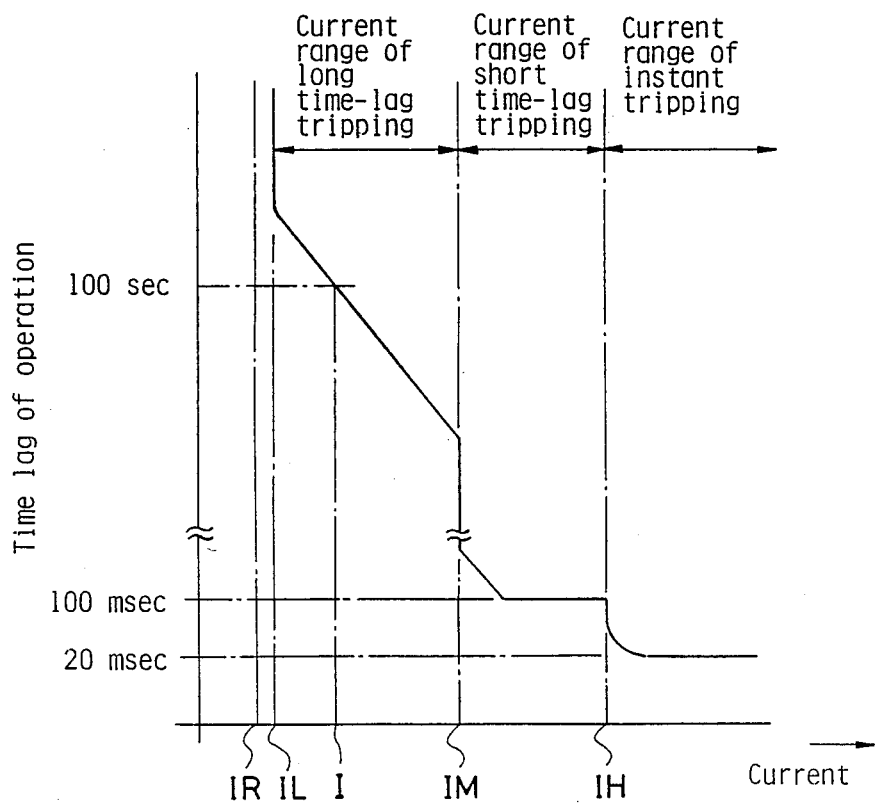

4,847,725

CIRCUIT BREAKER

FIELD OF THE INVENTION AND RELATED ART STATEMENT

1. Field of the Invention

The present invention relates generally to a circuit breaker, and more particularly to a circuit breaker having an over-current tripping device.

2. Description of the Related Art

A circuit breaker in the prior art is disclosed in the Japanese Published Unexamined Patent Application Sho 60-32211 or Japanese Utility Model Sho 55-29931, for example. In these prior art, when an over-current flows in distribution lines of an electric power by accident of an electrical equipment which is connected to the distribution lines or the distribution lines itself, the over-current is detected by a current transformer which is mounted on the distribution lines. The detected signal of the current transformer is inputted to a processing circuit, and when the current exceeds a predetermined value of the current, an output signal is issued and is applied to a timer circuit. The timer circuit outputs an output signal after a predetermined time period. The output signal is applied to the gate of a thyristor, and an over-current tripping coil is excited by turn-ON of the thyristor, and thereby contacts of the circuit breaker are opened.

A circuit block diagram of a conventional general circuit breaker is shown in FIG.4. Referring to FIG.4, a current transformer 21 is mounted on an alternating current distribution line 11. An output signal of the current transformer 21 is rectified by a full-wave rectifier 30. A voltage regulating circuit 500 is connected across a positive output terminal 31 and a negative output terminal 32 of the rectifier 30 through a resistor 40 for detecting a current flowing the voltage regulating circuit 500. The voltage regulating circuit 500 is provided with a center terminal 5c which is grounded. Therefore, the voltage regulating circuit 500 outputs a positive voltage $+V$ at a terminal 5a and a negative voltage $-V$ at a terminal 5d with respect to the center terminal 5c. A differential amplifier 60 is composed of an operational amplifier 63 and resistors 64, 65, 66 and 67. A voltage across both the terminals of the resistor 40 is converted to a signal which is produced across the ground and the output terminal of the differential amplifier 60.

A timer circuit 70 is composed of a long time-lag tripping circuit 170, a peak value converting circuit 210, an effective value converting circuit 211, a short time-lag tripping circuit 220 and an instant tripping circuit 230. The output signal of the operational amplifier 63 is applied to the peak value converting circuit 210, the effective value converting circuit 211 and the instant tripping circuit 230. The output signal of the peak value converting circuit 210 is applied to the short time-lag tripping circuit 220, and the output signal of the effective value converting circuit 211 is applied to the long time-lag tripping circuit 170. The respective output terminals of the long time-lag tripping circuit 170, the short time-lag tripping circuit 220 and the instant tripping circuit 230 are connected together, and are coupled to a terminal 70a of a switch 55. The other terminal of the switch 55 is coupled to a coil of a switch 120. A tripping coil 80 is coupled to a coil of a switch terminal 31 of the rectifier 30 and one terminal 80A of the switch 120. The other terminal 80b of the switch 120 is coupled to the negative terminal 5d of the voltage regulating circuit 500. A shut-off mechanism 100 is driven by the tripping coil 80 which is activated by a close of the switch 120, and a contact 201 is opened by the shut-off mechanism 100.

An operation inhibiting circuit 50 is connected across the positive output terminal 5a and the negative output terminal 5d of the voltage regulating circuit 500, when the output voltage of the voltage regulating circuit 500 is lower than a predetermined value, the switch 55 is opened to inhibit operation of the shut-off mechanism 100.

A voltage which is induced in the current transformer 21 by an alternating current flowing through the distribution line 11 is rectified by the full wave rectifier 30. The output current of the rectifier 30 flows the voltage regulating circuit 500 and the resistor 40, and a constant DC voltage is issued from the voltage regulating circuit 500. Thus, the full wave rectified current corresponding to the current 1a of the distribution line 11 flows through the voltage regulating circuit 500 and the resistor 40. The positive voltage $+V$ and the negative voltage $-V$ are issued from the respective terminals 5a and 5d of the voltage regulating circuit 40 with respect to the grounded center terminal 5c. The electric power for the differential amplifier 60 is supplied by the voltage regulating circuit 500, and a voltage Vin across both the terminals of the resistor 40 are inputted to the respective input terminals of the differential amplifier 60 through the resistors 64 and 66, respectively.

The output signal of the differential amplifier 60 is applied to the instant tripping circuit 230 and also to the short time-lag tripping circuit 220 through the peak value converting circuit 210, and also to the effective value converting circuit 211.

An output voltage Ex of the effective value converting circuit 211 is applied to the long time-lag tripping circuit 170.

In the above-mentioned timer circuit 70, as shown in FIG. 6, the instant tripping circuit 230 activates the shutoff mechanism 100 with a short time lag of 20 msec when a large current which is larger than a current $I_H$ flows. The short time-lag tripping circuit 220 activates the shutoff mechanism 100 with a time lag of 100 msec when a current which is lower than the current $I_H$ but is higher than a current $I_M$ flows. The long time-lag tripping circuit 170 activates the shutoff mechanism 100 with a time lag of 100 sec when a current $I_L$ which is lower than the current $I_M$ but is higher than a rated current $I_L$ flows.

FIG. 5 is the circuit block diagram of the long time-lag tripping circuit 170 in the conventional circuit breaker. The output voltage Ex is inputted to a comparator 35 of the long time-lag tripping circuit 170. When the output voltage Ex is equal to a reference voltage Ey of a reference voltage setting circuit 37, a switch 36 which is operated by the output of the comparator 35 is opened, and electric charge into a capacitor 38 is started.

For instance, when the current flowing the distribution line 11 is 200 amperes, if the output voltage Ex is 0.5 V, the reference voltage Ey of the reference voltage setting circuit 37 is set to 0.6 V. Then, when the output voltage Ex of the effective value converting circuit reaches 0.6 V, the switch 36 of the comparator 35 is opened, and electric charge to the capacitor 38 is started. In the above mentioned case, the current flowing the distribution lines is estimated to 240 amperes.

On the other hand, the output voltage Ex is applied to a voltage-current converting circuit 44 and is converted to a current Ib.

In the voltage-current converting circuit 44, the current Ib is in proportion to the square of the output voltage Ex. For example, when the voltage Ex is 0.5 V, the current Ib is 1 $\mu$A, and when the voltage Ex is 1 V, the current Ib becomes 4 $\mu$A.

When the voltage e1 of the capacitor 38 exceeds a reference voltage E2 of a reference voltage setting circuit 42 for setting a time period in long time-lag tripping operation, an output signal is issued from the comparator 41. The time period is 100 sec when the current I of the distribution line 11 is two times of the rated current, for example as shown in FIG.6.

For example, in case that a current of 80% of the rated current flows continuously, the circuit breaker is not tripped. However, the wires of the distribution lines are heated by the current. In the above mentioned state, when the current is increased to two times of the rated current, as mentioned above, the circuit breaker is tripped after 100 seconds. Whereas, the wires are considerably heated by the continuous current of 80% of the rated current, and the wires are further heated in high temperature by the current of two times of the rated current during the additional time period of 100 seconds. Thus the wire is liable to be damaged by unexpected temperature rise.

OBJECT AND SUMMARY OF THE INVENTION

An object of the present invention is to provide a circuit breaker wherein a time lag in a long time-lag tripping operation of a tripping device is shortened in case that a current which is substantially equal to a rated current flows during a long time period prior to increase of the current above the rated current.

The circuit breaker in accordance with the present invention comprises:

a first switch for opening or closing an distribution line, a current transformer for detecting a current of the distribution line, a rectifier for rectifying a detected signal of the current transformer, a voltage regulating circuit connected across a positive terminal and a negative terminal of the rectifier, detecting means for detecting an output current of the rectifier, a differential amplifier for amplifying the output of the detecting means, a timer circuit for producing a time lag corresponding to the current of the distribution line, a second switch to be operated by an output of the timer circuit, a tripping coil connected to the second switch for driving the first switch, wherein the timer circuit comprises:

a first reference voltage setting circuit for issuing a first reference voltage for setting the rated current, a second reference voltage setting circuit for issuing a second reference voltage which is lower than the first reference voltage, a first comparator for comparing an output voltage of the differential amplifier with the first reference voltage, a second comparator for comparing the output voltage of the differential amplifier with the second reference voltage, a voltage-current convertor for converting the output voltage of the differential amplifier to a current, a capacitor for charging the current from the voltage-current convertor, a current leaking means connected in parallel to the capacitor, a third switch connected in parallel to the capacitor and to be opened by an output of the first comparator, a fourth switch connected in parallel to the capacitor and to be opened by an output of the second capacitor, a third reference voltage setting circuit for issuing a reference voltage for setting a time lag in a long time-lag tripping operation, and a third comparator for comparing a terminal voltage of the capacitor with the reference voltage of the reference voltage setting circuit.

BRIEF DESCRIPTION OF THE DRAWINGS

FIG. 4 is the circuit block diagram of the conventional circuit breaker;

FIG. 5 is the circuit block diagram of the long time-lag tripping circuit in the conventional circuit breaker;

FIG. 6 is the graph showing operation of the conventional circuit breaker.

DESCRIPTION OF THE PREFERRED EMBODIMENTS

Figure 1:
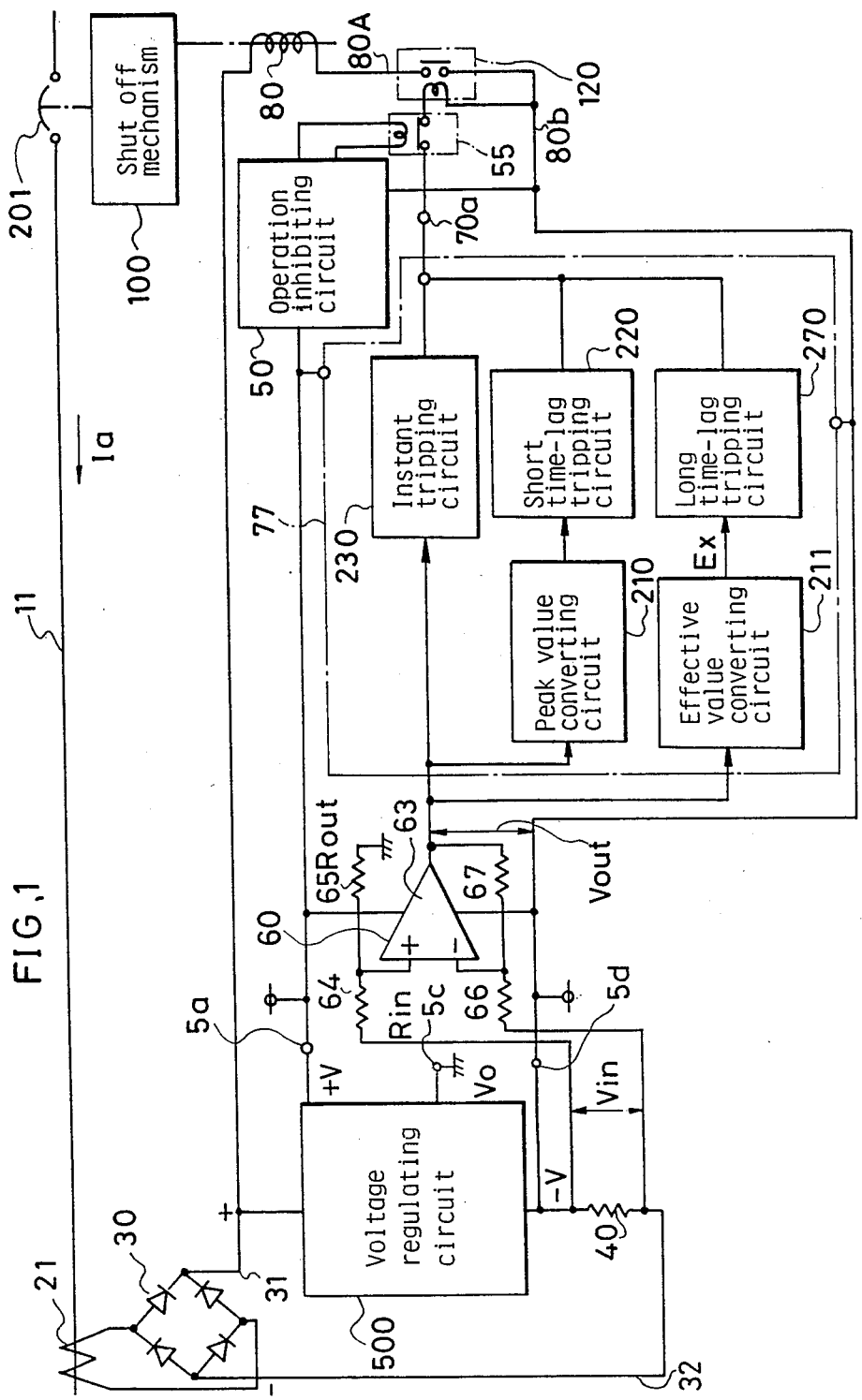
FIG. 1 is a circuit block diagram of an embodiment of a circuit breaker in accordance with the present invention.

A block diagram of an embodiment of the circuit breaker in accordance with the present invention is shown in FIG. 1. Referring to FIG. 1, a current transformer 21 is mounted on an alternating current distribution line 11. An output signal of the current transformer 21 is rectified by a full-wave rectifier 30. A voltage regulating circuit 500 is connected across a positive output terminal 31 and a negative output terminal 32 of the rectifier 30 through a resistor 40 for detecting a current flowing the voltage regulating circuit 500. The voltage regulating circuit 500 is provided with a center terminal 5c, which is grounded. Therefore, the voltage regulating circuit 500 outputs a positive voltage +V at a terminal 5a and a negative voltage −V at a terminal 5d with respect to the center terminal 5c. A differential amplifier 60 is composed of an operational amplifier 63 and resistors 64, 65, 66 and 67. A voltage across both the terminals of the resistor 40 is converted to a signal which is produced across the ground and the output terminal of the differential amplifier 60.

A timer circuit 77 is composed of a long time-lag tripping circuit 270, a peak value converting circuit 210, an effective value converting circuit 211, a short time-lag tripping circuit 220 and an instant tripping circuit 230. The output signal of the operational amplifier 63 is applied to the peak value converting circuit 210, the effective value converting circuit 211 and the instant tripping circuit 230. The output signal of the peak value converting circuit 210 is applied to the short time-lag tripping circuit 220, and the output signal of the effective value converting circuit 211 is applied to the long time-lag tripping circuit 270. The respective output terminals of the long time-lag tripping circuit 270, the short time-lag tripping circuit 220 and the instant tripping circuit 230 are connected together, and are coupled to a terminal 70a of a switch 55. The other terminal of the switch 55 is coupled to a coil of a switch 120. A tripping coil 80 is connected between the positive terminal 31 of the rectifier 30 and one terminal 80A of a switch 120. The other terminal 80b of the switch 120 is coupled to the negative terminal 5d of the voltage regulating circuit 500. A shut-off mechanism 100 is driven by the tripping coil 80 which is activated by close of the switch 120, and a contact 201 is opened by the shut-off mechanism 100.

An operation inhibiting circuit 50 is connected across the positive output terminal 5a and the negative output terminal 5d of the voltage regulating circuit 500. When the output voltage of the voltage regulating circuit 500 is lower than a predetermined value, the switch 55 is opened to inhibit operation of the shut-off mechanism 100.

Figure 2:
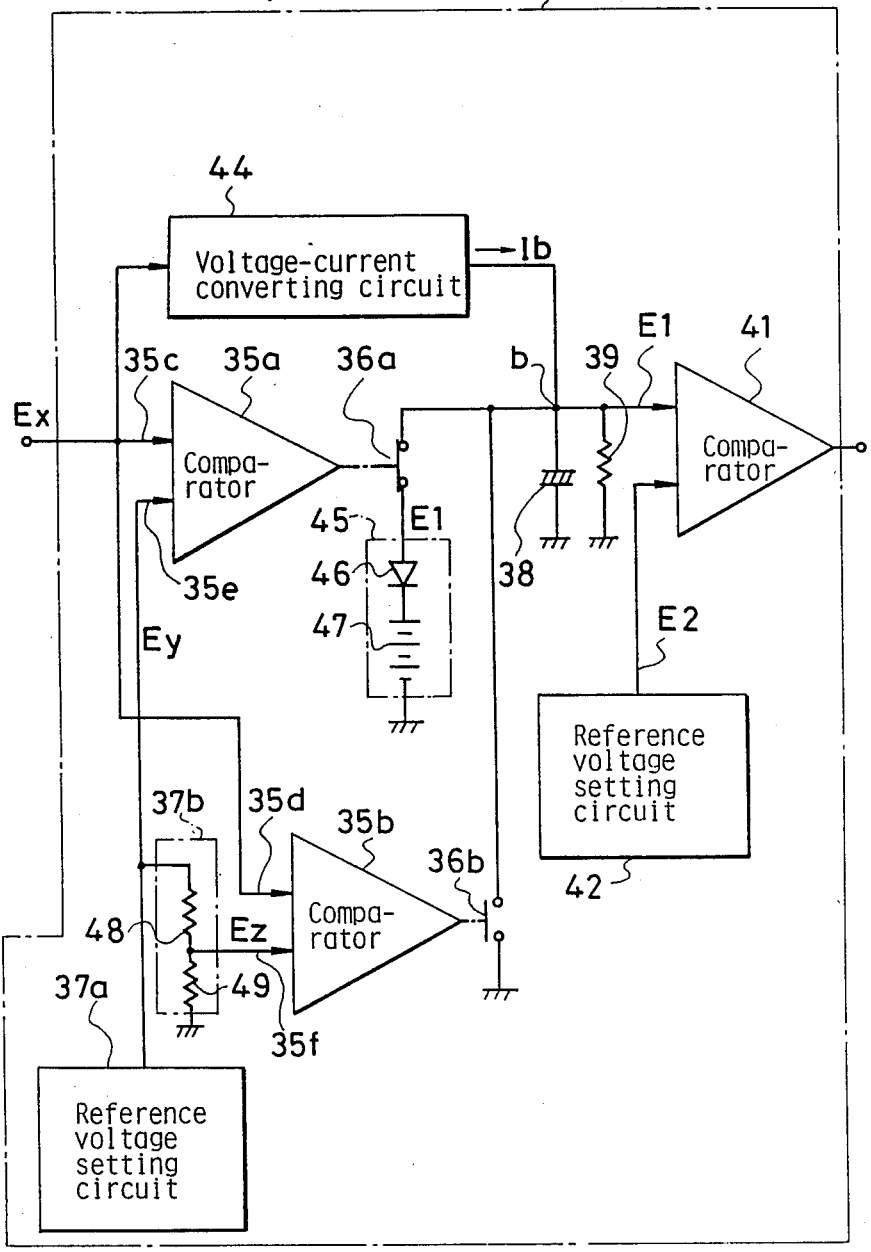
FIG. 2 is a circuit block diagram of a long timelag tripping circuit in the embodiment.

FIG. 2 is a circuit block diagram of the long time-lag tripping circuit 270. Referring to FIG. 2, an output voltage Ex of the effective value converting circuit 211 is applied to the respective input terminals 35c and 35d of comparators 35a and 35b. A switch 36a is operated by the output of the comparator 35a, and a switch 36b is operated by the comparator 36b. A reference voltage Ey of a reference voltage setting circuit 37a is applied to an input terminal 35e of the comparator 35a. A voltage Ez which is a voltage made by diving by the reference voltage Ey 48 and 49, is applied to an input terminal 35f of the comparator 35b. Each one terminal of the switches 36a and 36b is connected together and is coupled to an input terminal E1 of the comparator 41. The other terminal of the switch 36a is grounded through a bias power source 45. The bias power source 45 is composed of a battery 47 which is grounded at its negative terminal and an oppositely poled diode 46 which is coupled by its cathode to the positive terminal of the battery 47. The other terminal of the switch 36b is grounded. A capacitor 38 and a resistor 39 are connected between the input terminal E1 of the comparator 41 and the ground. A voltage-current conversion circuit 44 is connected between the input terminal 35c of the comparator 35a and the input terminal E1 of the comparator 41. A reference voltage power source 42 for setting a long time-lag is coupled to an input terminal E2 of the comparator 41.

Operation of the embodiment is elucidated hereafter.

A voltage which in induced in the current transformer 21 by an alternating current flowing the distribution line 11 is rectified by the full wave rectifier 30. The output current of the rectifier 30 flows the voltage regulating circuit 500 and the resistor 40, and a constant DC voltage is issued from the voltage regulating circuit 500. Thus, the full wave rectified current corresponding to the current 1a of the distribution line 11 flows the voltage regulating circuit 500 and the resistor 40. The positive voltage +V and the negative −V are issued from the respective terminals 5a and 5d of the voltage regulating circuit 40 with respect to the grounded center terminal 5c. The electric power for the differential amplifier 60 is supplied by the voltage regulating circuit 500, and a voltage Vin across both the terminals of the resistor 40 are inputted to the respective input terminals of the differential amplifier 60 through the resistors 64 and 66, respectively. A gain A of the differential amplifier 60 is given by $$A = Vout/Vin = Rout/Rin.$$

The output signal of the differential amplifier 60 is applied to the instant tripping circuit 230, and through the peak value converting circuit 210 to the short time-lag tripping circuit 220 and through the effective value converting circuit 211 to the long time-lag tripping circuit 270.

Figure 3:
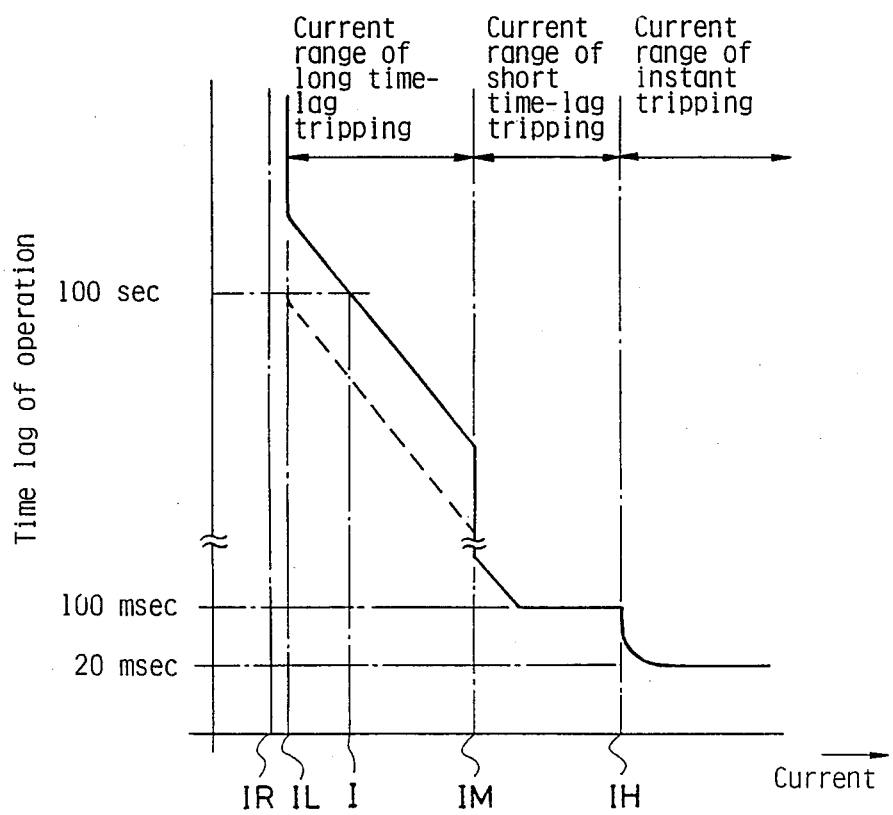
FIG. 3 is a graph showing operation of the embodiment.

FIG. 3 is a graph showing operation of the circuit breaker in accordance with the present invention. Referring to FIG. 3, when a current flowing in the distribution line 11 exceeds the current $I_H$, a voltage Vin corresponding to the current of the voltage regulating circuit 500 increases and an output voltage Vout of the differential amplifier 60 significantly increases. Consequently, the instant tripping circuit 230 is immediately activated, and the switch 120 is closed within 20 milliseconds. The current range which is larger than the current $I_H$ is named "current range of instant tripping".

When the current of the distribution line 11 is smaller than the current $I_H$ but is larger than a current $I_M$ as shown in FIG. 3, the short time-lag tripping circuit 220 is activated, and the switch 120 is closed within 100 milliseconds. The current range between the current $I_M$ and $I_H$ is "current range of short time-lag tripping".

When the current of the distribution line 11 is smaller than the current $I_M$ but is larger than a current $I_L$ shown in FIG. 3, the long time-lag tripping circuit 270 is activated as shown hereafter. Referring to FIG. 2, the output voltage Ex from the effective value converting circuit 211 is inputted to the comparators 35a and 35b. When the output voltage Ex reaches a reference voltage Ez of the reference voltage setting circuit 37b, the switch 36b is opened by the output of the comparator 35b. Then, the capacitor 38 is charged by the output current Ib of the voltage-current converting circuit 44. In this time, since the switch 36a is closed, the terminal voltage E1 of the capacitor 38 does not exceed the voltage E1 of the power source circuit 45. Since the voltage E1 of the power source circuit 45 is lower than the output voltage E2 of the reference voltage setting circuit 42, the output terminal of the comparator 41 remains low level.

When the current Ia of the distribution line 11 is 200 A which is a rated current of the circuit breaker, for example, the output voltage Ex of the effective value converting circuit 211 is set to 0.5 V, and the reference voltage Ey and Ez of the reference voltage setting circuit 37a and 37b are set to 0.6 V and 0.4 V, respectively. In this case, when the output voltage Ex of the effective value converting circuit 211 reaches 0.4 V, the switch 36b of the comparator 35b is opened and charge to the capacitor 38 is started.

In the above-mentioned condition, when the current Ia flowing the distribution line 11 is 160 A, which is 80% of the rated current 200 A, the distribution line 11 is gradually heated. However, the distribution line 11 is not damaged by heating since the current is lower than the rated current of the circuit breaker. The output voltage Ex is 0.4 V (80% of 0.5 V), and the switch 36b of the comparator 35b is opened. Therefore, the capacitor 38 is charged by the output of the voltage-current converting circuit 44.

Subsequently, when the current Ia of the distribution line 11 is increased to 400 A which is double as large as the rated current 200 A, for instance, the output voltage Ex of the effective value converting circuit 211 becomes 1 V, and exceeds the reference voltages Ey and Ez. Consequently, the switch 36a is opened. The output current Ib of the voltage-current converting circuit 44 flows in the capacitor 38 because of open state of the switch 36a. Since the capacitor 38 is already charged until the voltage E1 of the power source circuit 45, the capacitor 38 is further charged so that the terminal voltage of the capacitor 38 reaches the output voltage Ex from the voltage E1. When the voltage E1 of the capacitor 38 exceeds the voltage E2 of the reference voltage setting circuit 42, the output signal of the comparator 41 turns to high level, and the switch 120 is closed. Consequently, the tripping coil 80 is activated, and the contact 201 is opened through the shut-off mechanism 100.

As mentioned above, when the current of the distribution line 11 is increased to 200% of the rated current from 80% of the rated current, the voltage E1 of the capacitor 38 is already retained to the voltage E1 which is equal to the voltage of the power source circuit 45. Therefore, a time period wherein the voltage E1 exceeds the reference voltage E2 of the reference voltage setting circuit 42 is shortened as a result, the time-lag in the long time-lag tripping operation is also shortened as shown by a dotted line in the graph of FIG. 3.

On the other hand, when the current 1a of the distribution line 11 is rapidly increased to a valuse twice as large as the rated current from a comparatively low current, both the switches 36a and 36b are simultaneously opened. Since the voltage E1 of the capacitor 38 is retained to zero until opening of the switches 36a and 36b, a long charging time is required. Therefore, the circuit breaker is operated by the long time-lag operation which is similar to the operation as shown in FIG. 6 as shown by the solid line in the graph of FIG. 3. In above-mentioned case, the distribution line 11 is not heated by the low current prior to increase of the current. On the contrary, in case that the current of 80% of the rated current has been flowing before increase of a double of the rated current and hence the distribution line 11 has been considerably heated, the time lag of the long time-lag tripping operation is shortened in comparison with state which is not heated, and thereby unexpected trouble is effectively prevented.

In case that the current 1a of the distribution line 11 is comparatively small such as 10%–20% of the rated current, the output voltage of the voltage regulating circuit 500 is low and operation of the timer circuit 70 is liable to be unstable. In order to prevent mal-operation of the timer circuit 77 in the abovementioned state, the switch 55 of the operation inhibiting circuit 50 is opened, and thereby closing operation of the switch 120 is blocked.

In the embodiment, the effective value converting circuit 211 can be replaced by the peak value converting circuit 210.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. The circuit breaker comprising:
   a first switch for opening or closing a distribution line,
   a current transformer for detecting a current of said distribution line,
   a rectifier for rectifying a detected signal of said current transformer,
   a voltage regulating circuit connected across a positive terminal and a negative terminal of said rectifier,
   detecting means for detecting an output current of said rectifier,
   a differential amplifier for amplifying an output of said detecting means,
   a timer circuit for producing a time lag corresponding to said current of said distribution line,
   a second switch to be operated by an output of said timer circuit,
   a tripping coil connected to said second switch for driving said first switch, wherein
   said timer circuit comprises:
   a first reference voltage setting circuit for issuing a first reference voltage for setting said rated current,
   a second reference voltage setting circuit for issuing a second reference voltage which is lower than said first reference voltage,
   a first comparator for comparing an output voltage of said differential amplifier with said first reference voltage,
   a second comparator for comparing said output voltage of said differential amplifier with said second reference voltage,
   a voltage-current convertor for converting said output voltage of said differential amplifier to a current,
   a capacitor for charging from said current from said voltage-current convertor,
   a current leaking means connected in parallel to said capacitor,
   a third switch and power source connected in parallel to said capacitor and to be opened by an output of said first comparator,
   a fourth switch connected in parallel to said capacitor and to be opened by an output of said second comparator
   a third reference voltage setting circuit for issuing a reference voltage for setting a time lag in a long time-lag tripping operation, and
   a third comparator for comparing a terminal voltage of said capacitor with said reference voltage of said reference voltage setting circuit.

* * * * *